United States Patent [19]
Drexler

[11] Patent Number: 5,988,743
[45] Date of Patent: *Nov. 23, 1999

[54] INFANT SAFETY SEAT

[75] Inventor: Johannes Herman Drexler, Doesburg, Netherlands

[73] Assignee: B.V. Machine-en Metaalwaren-fabriek Dremefa, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,253

[22] Filed: Dec. 9, 1996

[30] Foreign Application Priority Data

Dec. 13, 1995 [NL] Netherlands ............................ 1001896

[51] Int. Cl.⁶ .................................................... A47C 1/11
[52] U.S. Cl. ...................................... 297/250.1; 297/183.2
[58] Field of Search .............................. 297/250.1, 183.3, 297/183.2, 216.11, 271.6, 258.1

[56] References Cited

U.S. PATENT DOCUMENTS

| | | | |
|---|---|---|---|
| 4,099,770 | 7/1978 | Elsholz et al. | 297/250.1 X |
| 4,634,177 | 1/1987 | Meeker | 297/250.1 |
| 4,711,490 | 12/1987 | Brand | 297/250.1 |
| 4,834,420 | 5/1989 | Sankrithi et al. | 297/250.1 X |
| 5,005,234 | 4/1991 | Kelleher et al. | |
| 5,110,182 | 5/1992 | Beauvais | 297/216.11 |
| 5,368,328 | 11/1994 | Kamiyama et al. | 297/216.11 X |
| 5,496,083 | 3/1996 | Shouse, Jr. | 294/1.1 |
| 5,575,530 | 11/1996 | Harper et al. | 297/260.2 |

FOREIGN PATENT DOCUMENTS

| | | | |
|---|---|---|---|
| 0 363 556 | 4/1990 | European Pat. Off. | B60N 2/28 |
| 0 408 415 | 1/1991 | European Pat. Off. | B60N 2/28 |
| 0 574 848 | 12/1993 | European Pat. Off. | B60N 2/28 |
| 0 603 520 | 6/1994 | European Pat. Off. | B60N 2/28 |
| 9400114 | 9/1995 | Netherlands | B60N 2/26 |
| 2 288 328 | 10/1995 | United Kingdom | B60N 2/28 |

OTHER PUBLICATIONS

Copy of EPO Office Action dated May 19, 1998.

*Primary Examiner*—Peter M. Cuomo
*Assistant Examiner*—Stephen Vu
*Attorney, Agent, or Firm*—Michael D. Bednarek; Crowell & Moring LLP

[57] ABSTRACT

An infant safety seat of the type, comprising a bucket seat body having a supporting bottom and a pivotable carrying handle and provided with attachment points for the hip belt portion and the shoulder belt portion respectively of a threepoints-safety belt. Between the support bottom surface and the seat surface thereabove there is a transverse through belt receiving space adjacent the front side of the bucket seat body, said space being delimited at the front side by a transverse and upstanding belt holding surface, that is accessible for a belt from an end of the bucket seat body.

6 Claims, 2 Drawing Sheets

INFANT SAFETY SEAT

FIELD OF THE INVENTION

The invention relates to an infant safety seat of the type, comprising a bucket seat body having a supporting bottom and a pivotable carrying handle and provided with attachment points for the hip belt portion and the shoulder belt portion respectively of a threepoints-safety belt.

BACKGROUND

Such an infant safety seat is disclosed in EP-0 317 438 and is designed for use in various situations. In addition to the use as an infant carrier and as a rocker seat respectively this seat is, with its carrying handle swung in a forwardly directed position, adapted for placement on a passenger's seat in an automobile. In the latter case the bucket seat becomes with its front end directed to the backrest of the passenger's seat, while the horizontal portion of the obliquely forwardly directed carrying handle may support against the backrest of the respective passenger's seat.

The attachment points for the threepoints-safety belt associated with the respective passenger's seat comprise an attachment point for the hip belt portion on each of the two arm rest portions of the bucket seat body, and two attachment points on the backside of the backrest portion to guide the shoulder belt portion. To secure the infant seat on the passenger's seat the shoulder belt portion and the hip belt portion of the threepoints-safety belt are passed along the attachment points on the backrest portion and those on the armrest portions of the bucket seat body respectively.

From a viewpoint of safety the well-known infant seat amply satisfies the requirements. In all of the circumstances that may occur in practice the threepoints-safety belt and the additional support through the obliquely forwardly directed carrying handle hold the infant seat firmly in place on the passenger's seat. In practice, however, the act of passing the hip belt portion and the shoulder belt portion of the three points safety belt along the various attachment points on the bucket seat body is experienced as rather inconvenient, whereas the available belt length is unsufficient in some automobile types.

SUMMARY OF THE INVENTION

The invention aims at overcoming this drawback of the well-known infant safety seat, without affecting the safety aspect.

Accordingly, the infant seat proposed by this invention is characterized by a transverse through belt receiving space adjacent the front side of the bucket seat body and positioned between the support bottom surface and the seat surface thereabove, said space being delimited at the front side by a transverse and upstanding belt holding surface, that is accessible for a safety belt from an end of the bucket seat body.

This permits the loop that is formed by the shoulder belt portion and the hip belt portion to be inserted from an end of the bucket seat body into the belt receiving space between the supporting bottom surface and the seat surface and then cause the hip belt portion to engage the said upstanding surface so that the latter is functioning as a forward attachment point; thereupon the usual slide buckle on said loop is inserted in the associated lock and the section of the shoulder belt portion that returns from said slide buckle is passed around the rear end of the bucket seat body.

The upstanding surface serving as an attachment or holding point for the hip belt portion is positioned at a substantially lower level than the attachment points on the armrests with the well-known seat. This allows the use of a substantially shorter belt length.

In one preferred embodiment the belt receiving space is accessible from the rear end of the bucket seat body through an inserting slot that opens into the rear wall surface and into the side wall surfaces of the bucket seat body. This embodiment is preferred over that, with which the belt receiving space is accessible from the front side of the seat. For a receiving space accessible from the rear side enables to place the infant seat at first on the respective passenger's seat, after which the belt loop may be simply applied from the front side of the passenger's seat.

BRIEF DESCRIPTION OF THE DRAWINGS

The invention will be hereinafter further explained by a few examples with reference to the drawing.

DETAILED DESCRIPTION

Figure 1:
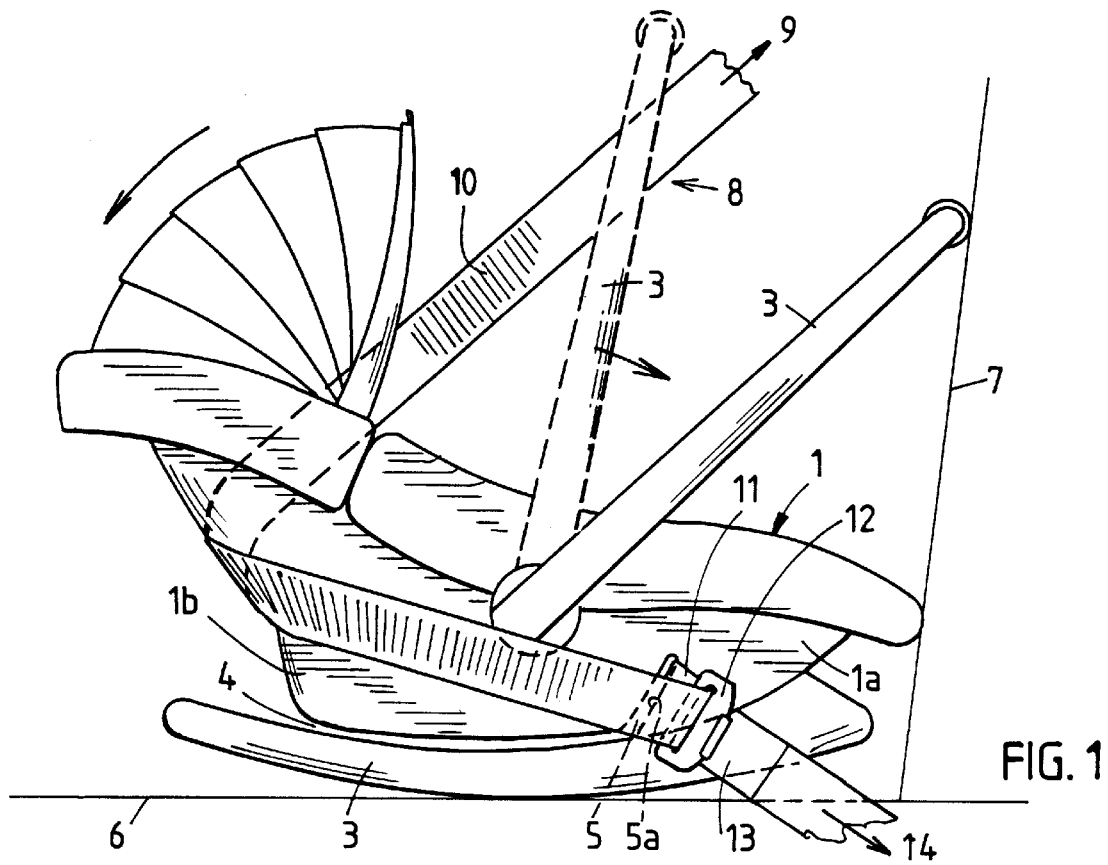
FIG. 1 is a side view of a first embodiment of the seat according to the invention.

With reference to FIG. 1 the infant seat shown therein has a bucket-shaped seat body 1 provided with a carrying handle that is pivotally mounted about a transverse axis. The seat body 1 is fastened on a sledge-shaped support bottom 3, which may also serve as a rocking bottom. Only the forward part 1a of the bucket body 1 is supported by the sledge 3; between the rearward part 1b of the bucket body 1 and the sledge 3 there is a rearwardly and laterally open insert slit 4, that is connected, at the transition between the "floating" rear part 1b of the bucket body and the forward part 1a of the bucket body, to a substantially upstanding and laterally open belt receiving space 5.

The drawing shows the seat with the sledge 3 supporting on the diagrammetically represented passenger's seat and with the front edge of the bucket body 1 and the carrying handle supporting against the diagrammatically represented backrest 7 of the passenger's seat in an automobile.

The infant seat is secured in its represented position on the passenger's seat by means of the safety belt 8, usually a threepoints-safety belt, belonging to said passenger's seat. The shoulder belt portion 10 of the safety belt 8 extends from an elevated fastening point 9, which is often designed for automatic winding; the hip belt portion 11 extends from a fixed fastening point (not shown) that is positioned substantially right below said fastening point 9. The shoulder belt portion 10 and the hip belt portion 11 form a loop that may be simply introduced from the front side of the passenger's seat, through the insert space 4 into the belt receiving space 5, that extends from the end of the insert space 4 upwardly. This causes the hip belt portion 11 to engage the forwardly directed surface 5a of the receiving space 5 that functions as a holding surface, whereas the shoulder belt portion 10 extends obliquely along the rear side of the bucket body 1 downwardly and forwardly. Upon having inserted the safety belt in this manner, the usual slide buckle 12 may be inserted in a well-known manner into the associated lock 13 at the "third" fastening location 14.

The rearward part 1b of the bucket body 1 and the sledge 3 could, under load, bend to one another. The sledge 3 may then also function as a stop.

Figure 2:
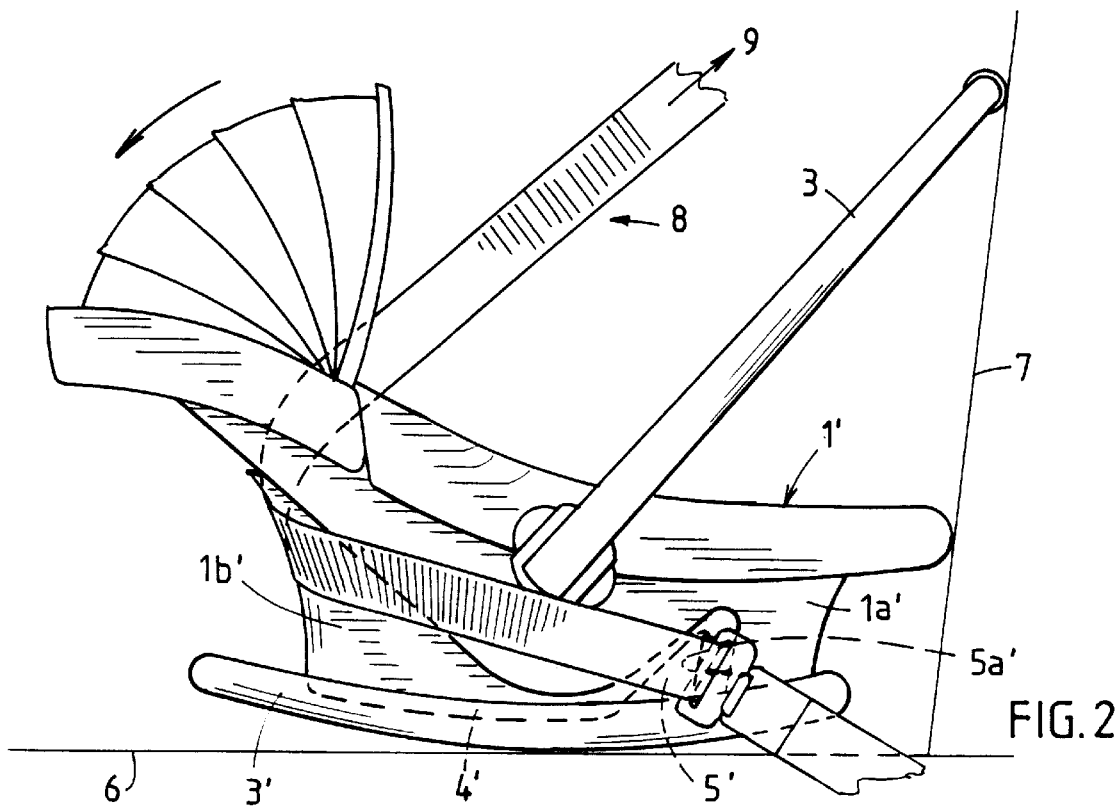
FIG. 2 is a side view of a second embodiment of the infant seat according to the invention and FIG. 3 is a side view of a third embodiment of the infant seat according to the invention.

In the embodiment shown in FIG. 2 the bucket seat body has a forward column-shaped portion 1a', by means of which it is fastened on the forked sledge 3'. Behind the column-shaped portion 1a' there is a transverse through belt receiving space 5a, the forward upstanding surface 5a' of which serving as a holding surface for the hip belt portion of the safety belt. Also in this case the receiving space 5' is accessible from the rear end of the body 1'. In this case, however, the rear bucket part 1b' extends further downwardly between the legs of the forked sledge 3'. Thus, as compared with the embodiment of FIG. 1, the insert space 4' for the belt loop is positioned at a lower level.

In FIG. 2, for clarity's sake, the hip belt portion is not shown.

Figure 3:
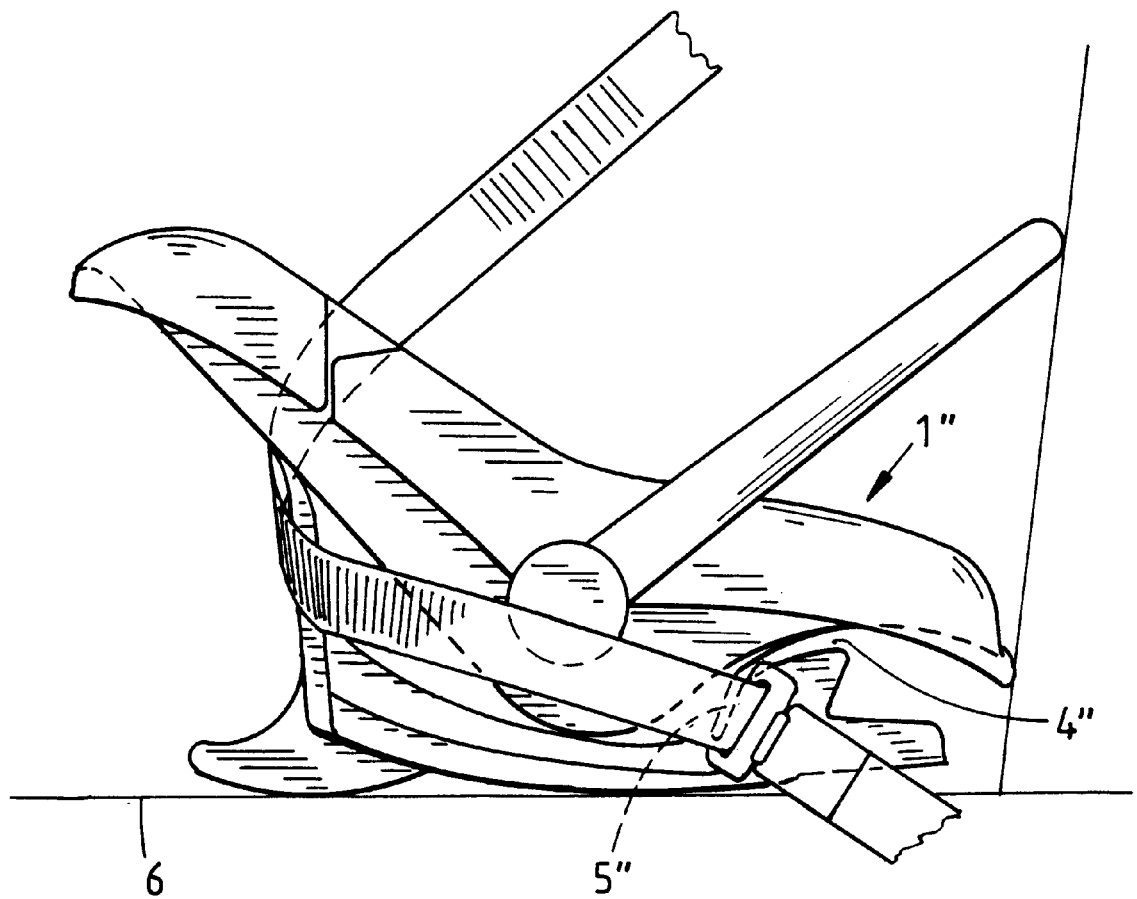

FIG. 3 shows an embodiment of an infant seat according to the invention, with which the receiving space 5" for the hip belt portion is accessible from the front side of the bucket body 1" via an insert slot 4", that merges from above into the receiving space 5". As seen in the drawing the insert opening of the inserting slit 4" is positioned at a location that is rearwardly spaced from the front edge of the seat body 1". This enables the belt loop above referred to to be easily placed about the forward edge portion of the seat body and then inserted with the hip portion of the belt through the insert slot 4" into the belt receiving space 5".

What is claimed is:

1. An infant safety seat adapted to be secured against a backrest of a passenger vehicle seat using a hip belt portion and a shoulder belt portion of a three point safety belt in order that the seat faces the backrest, wherein the seat has a front side proximate the backrest and a rear side spaced further away from the backrest than the front end, comprising a bucket seat body for holding an infant so that the infants head is proximate the rear side of the seat body and the infant's feet are proximate the front side of the seat body, the seat further comprising a supporting bottom surface and a pivotable carrying handle and provided with attachment portions for the hip belt portion and the shoulder belt portion respectively of a three points-safety belt, characterized by a belt receiving space adjacent to the front side of a bucket seat body and positioned between the supporting bottom surface and the seat surface thereabove, said space being delimited at the front side by a transverse and upstanding belt holding surface, that is accessible for a safety belt from an opening disposed at the rear side of the bucket seat body, the opening extending forward to merge into the belt receiving space so as to allow a loop formed by the shoulder belt portion and the hip belt portion to be inserted from the rear side of a seat body into the belt receiving space between the supporting bottom surface and the seat surface and then allow the hip belt portion to engage the upstanding belt holding surface.

2. An infant seat according to claim 1, characterized in that the inserting slot merges into said belt receiving space at an upper end of the the belt receiving space.

3. An infant seat according to claim 1, characterized in that the bucket seat body and the bottom support are formed as separate parts.

4. An infant safety seat having a foot end (1a; 1a') adapted to be placed in engagement with a backrest (7) of a passenger vehicle seat having a three point safety belt (8) including a shoulder belt portion (18) and a hip belt portion (11), wherein the safety seat is adapted to be secured by a three point safety belt (8) to the vehicle seat, comprising a bucket seat body (1; 1'; 1") with a backrest portion (16; 16'), a foot end portion (1a; 1a'), side walls, a substantially U-shaped carrying handle (2) pivotally connected to said side walls about a transverse axis, a lower surface and a support bottom (3; 3'; 3"), means for guiding and holding the shoulder belt portion (10) of said three point safety belt (8) around the back side of the backrest portion (1b; 1b') of said bucket seat body (1; 1'; 1"), a transverse through belt receiving space (5; 5'; 5") between said support bottom (3; 3'; 3") and the lower surface of said bucket seat body (1; 1'; 1"), said receiving space (5; 5'; 5") being accessible from the foot end portion of said bucket seat body through a laterally open slit (4; 4'; 4"), the slit merging into the belt receiving space so as to allow insertion of the hip belt portion (11) of said three point safety (8) belt from the foot end portion of the infant seat into said receiving space (5; 5'; 5") for engagement with belt holding means (5a) provided in said belt receiving space, characterized in that said belt holding means (5a) in said receiving space (5; 5'; 5") is constituted by an upstanding holding surface (5a), that faces away from the foot end portion (1a; 1a') of said bucket seat body.

5. An infant safety seat according to claim 4, wherein said belt receiving space (5") is accessible from the foot end portion of said bucket seat body (1") through an insertion slit (4") that is located at a position which is rearwardly spaced from the front edge of said bucket seat body (1"), characterized in that said belt inserting slot (4") bends downwardly to merge into said belt receiving space (5") containing said upstanding holding surface.

6. An infant safety seat according to claim 4, characterized in that said bucket seat body (1; 1') and said support bottom (3; 3') are formed as separate parts, which are connected at a front end of said bucket seat body (1; 1') only and are spaced from one another at a rear end.

* * * * *